(12) United States Patent
Yoshizawa et al.

(10) Patent No.: US 8,107,431 B2
(45) Date of Patent: *Jan. 31, 2012

(54) MASTER STATION IN COMMUNICATIONS SYSTEM AND ACCESS CONTROL METHOD

(75) Inventors: Kensuke Yoshizawa, Osaka (JP); Shinichiro Ohmi, Toyono-gun (JP); Tsuyoshi Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1002 days.

This patent is subject to a terminal disclaimer.

(21) Appl. No.: 12/007,782

(22) Filed: Jan. 15, 2008

(65) Prior Publication Data

US 2008/0123594 A1    May 29, 2008

Related U.S. Application Data

(62) Division of application No. 10/911,569, filed on Aug. 5, 2004, now Pat. No. 7,346,021.

(30) Foreign Application Priority Data

Aug. 6, 2003 (JP) ................................ 2003-288092

(51) Int. Cl.
    *H04W 4/00*    (2009.01)
(52) U.S. Cl. ...................................................... 370/330
(58) Field of Classification Search .................. 370/347
    See application file for complete search history.

(56) References Cited

U.S. PATENT DOCUMENTS

| 5,488,631 | A   | * | 1/1996  | Gold et al. .................... 375/145 |
| 5,754,799 | A   |   | 5/1998  | Hiles |
| 5,778,075 | A   | * | 7/1998  | Haartsen ....................... 380/272 |
| 6,570,857 | B1  | * | 5/2003  | Haartsen et al. .............. 370/312 |
| 6,788,656 | B1  |   | 9/2004  | Smolentzov et al. |
| 7,280,801 | B2  | * | 10/2007 | Dahl ............................. 455/41.2 |
| 7,471,667 | B2  |   | 12/2008 | Hirsch et al. |
| 7,664,030 | B2  | * | 2/2010  | Sugaya ......................... 370/235 |
| 7,796,573 | B2  | * | 9/2010  | Belcea .......................... 370/338 |
| 2002/0105970 | A1 | * | 8/2002 | Shvodian ...................... 370/468 |
| 2003/0110291 | A1 | * | 6/2003 | Chen ............................. 709/244 |
| 2003/0128684 | A1 |   | 7/2003 | Hirsch et al. |
| 2003/0151513 | A1 | * | 8/2003 | Herrmann et al. ......... 340/573.1 |
| 2003/0169697 | A1 |   | 9/2003 | Suzuki et al. |
| 2003/0185166 | A1 | * | 10/2003 | Belcea ......................... 370/321 |
| 2005/0243765 | A1 | * | 11/2005 | Schrader et al. ............. 370/328 |

FOREIGN PATENT DOCUMENTS

| JP | 2001-118191  | 4/2001 |
| JP | 2002-198834  | 7/2002 |
| JP | 2003-37556   | 2/2003 |
| JP | 2003-143644  | 5/2003 |
| JP | 2005-514859  | 5/2005 |

* cited by examiner

*Primary Examiner* — Jeffrey Pwu
*Assistant Examiner* — Saad A Waqas
(74) *Attorney, Agent, or Firm* — Wenderoth, Lind & Ponack, L.L.P.

(57) ABSTRACT

A communication band is divided into: a beacon period in which every master station transmits a beacon packet in competition with one another; a guaranteed-band period (e.g., a TDMA period or an FDMA period) in which only a specific permitted station is allowed access; and a CSMA period in which every station is allowed access in competition with one another. Plural master stations exchange information of a communication band used in the guaranteed-band period with each other, and based on the respective information, a communication band available to the master station's own communications system in the guaranteed-band period is calculated.

4 Claims, 9 Drawing Sheets

MASTER STATION IN COMMUNICATIONS SYSTEM AND ACCESS CONTROL METHOD

This is a Rule 1.53(b) Divisional of Ser. No. 10/911,569, filed Aug. 5, 2004 now U.S. Pat. No. 7,346,021

BACKGROUND OF THE INVENTION

1. Field of the Invention

The present invention relates to a master station to be used in a communications system and an access control method. More particularly, the present invention relates to an access control method which is to be used by a plurality of communications system sharing the same channel and which prevents interferences between the communications systems.

2. Description of the Background Art

As a technique for reducing interferences occurring between a plurality of communications system sharing the same channel, access control methods for reducing the influences of interference waves by using transmission power control have been proposed, as disclosed in, e.g., Japanese Laid-Open Patent Publication No. 2002-198834 and Japanese Laid-Open Patent Publication No. 2003-37556.

Japanese Laid-Open Patent Publication No. 2002-198834 discloses a method where an attenuator is provided in a base station for attenuating signal power and interference power, while utilizing the transmission power of a transmitter in a terminal station to ensure that the power level of a wireless signal to be input to a receiver attains a reference level.

On the other hand, Japanese Laid-Open Patent Publication No. 2003-37556 discloses a method in which a base station which has detected interference waves issues interference information to another base station which is transmitting the interference waves via a LAN network, and the other base station having received the notification lowers its transmission power based on the interference information.

However, in the case where the above-described communications system is a power line communications system, due to the characteristics of the power line transmission path, signal attenuation within a device's own communications system may far exceed the signal attenuation which causes interference in another communications system, depending on the configuration of the devices which are connected to the network. In other words, in the case where the technique of Japanese Laid-Open Patent Publication No. 2002-198834 or Japanese Laid-Open Patent Publication No. 2003-37556 is applied to a power line communications system, if interference between communications systems is prevented through power control, some of the devices in the system may become unable to perform communications with other devices due to a reduced signal intensity, depending on the device configuration. In the case of a wireless communication, too, a similar phenomenon may occur in that an attenuation in the signal intensity due to shielding obstacles may cause a drastic drop in the signal intensity despite a small physical distance.

With such conventional structures, it is impossible, through transmission power control, to suppress interferences for other communications systems while maintaining a good communication quality within a device's own communications system. Therefore, there has been a problem in that the throughput in each communications system is greatly deteriorated due to interferences between the communications systems, and that it is difficult to control the communication band.

SUMMARY OF THE INVENTION

Therefore, an object of the present invention is to provide a master station and an access control method which, in the presence of a plurality of communications systems sharing the same channel, easily avoids interferences between the communications systems while guaranteeing QoS in the communication bands of the communications systems, without having to perform transmission power control.

The present invention is directed to a master station for use in a system environment including a plurality of communications systems sharing a same channel, each communications system including a master station and at least one slave station kept under management by the master station. In order to attain the object mentioned above, the master station comprises: a communication section, an acquisition section, and a determination section.

The communication section performs communications using a communication band which is divided into: a beacon period in which every master station transmits a beacon packet in competition with one another; a time division multiple access (TDMA) period in which only a specific permitted station is allowed access using a communication band which is allocated through time division; and a carrier sense multiple access (CSMA) period in which every station is allowed access in competition with one another, the communications being performed in a cycle comprising the beacon period, the TDMA period, and the CSMA period. The acquisition section acquires a state of used communication band in each of the other communications systems. Based on the states of used communication band acquired by the acquisition section, the determination section calculates a communication band available to the master station's own communications system in the TDMA period, and determining whether a communication which is requested by the at least one slave station is granted or rejected in accordance with the calculated communication band.

Typically, the acquisition section may acquire the state of used communication or frequency band in each of the other communications systems by exchanging information with the other master station using the CSMA period, or acquire the state of used communication or frequency band in each of the other communications systems from a beacon packet received from the other master station in the beacon period.

In response to requests from a plurality of slave stations which do not interfere with one another in performing communications, the determination section may grant the requests to perform communications during a same communication slot, whereby it becomes possible to effectively utilize the communication band.

In particular, in the case where the TDMA period is used as one of the divided periods, it is preferable that a ratio between the TDMA period and the CSMA period dynamically varies in accordance with a total communication band required by the specific station.

On the other hand, in the case where the FDMA period is used as one of the divided periods, it is preferable that, in response to a request from the at least one slave station, the determination section grants the request to perform a communication using an unused frequency band in the FDMA period. Moreover, in the case where the communication band is subjected to frequency division by a multicarrier communication scheme utilizing a plurality of subcarriers, it would be effective if the number of used subcarriers among the plurality of subcarriers dynamically varies in accordance with a total frequency band required by the specific station.

The processes performed by the component elements of the master station described above may be regarded as an access control method defining a sequence of processing steps. Such a method may be provided in the form of a program for causing a computer to execute the sequence of processing steps. Such a program may be introduced into the computer in a recorded form on a computer readable recording medium. Alternatively, the component elements of the master station described above may be implemented as an LSI, which is an integrated circuit.

Thus, according to the present invention, the communication band is divided into a beacon period, a guaranteed-band period (TDMA or FDMA), and a CSMA period, and the allocation in the TDMA or FDMA period is determined based on the information of the communication band used by each communications system. As a result, even in the case where plural communications systems share the same channel, it is possible to easily avoid interferences between communications systems without having to perform transmission power control, while retaining good QoS in the communication bands for the respective communications systems.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be specifically described with reference to the figures.

Figure 1:
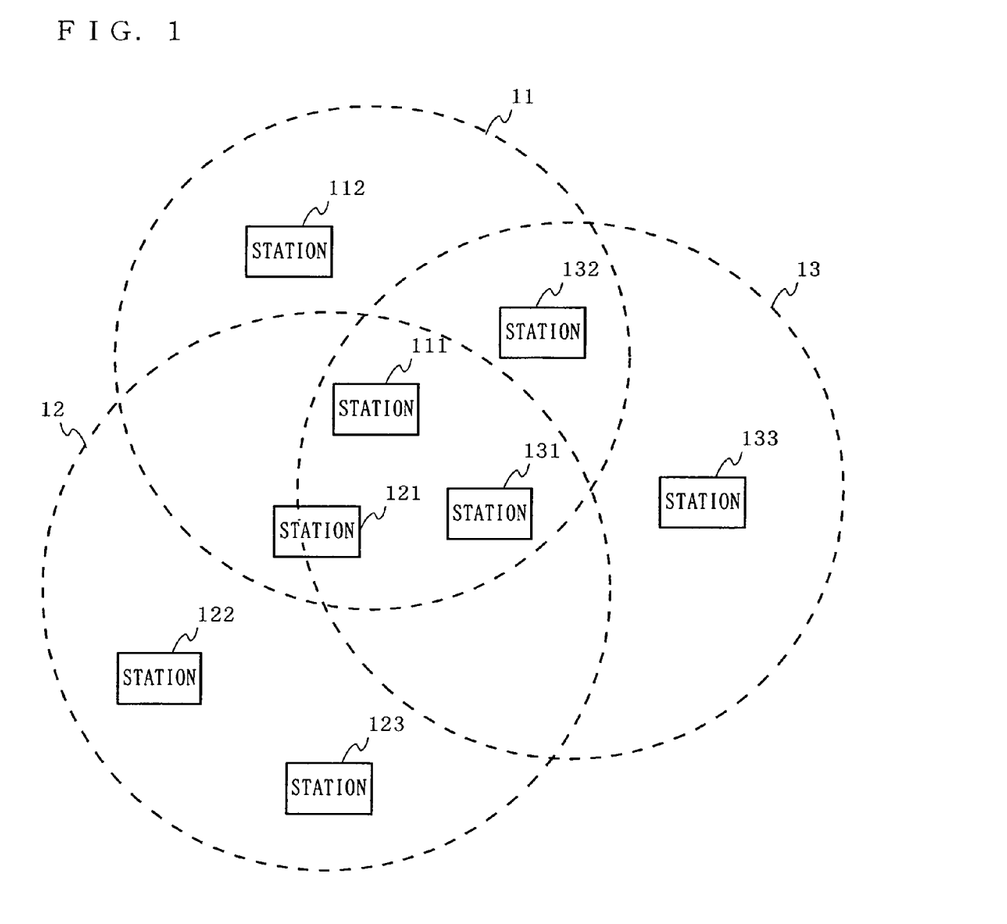
FIG. 1 is a diagram illustrating an exemplary environment of a communications system to which the present invention is applicable.

FIG. 1 is a diagram illustrating an exemplary environment of a communications system to which the present invention is applicable. FIG. 1 illustrates an exemplary environment including three communications systems 11 to 13 which interfere with one another. The communications system 11 is composed of a master station 111 and a slave station 112; the communications system 12 is composed of a master station 121, a slave station 122, and a slave station 123; and the communications system 13 is composed of a master station 131, a slave station 132, and a slave station 133.

Figure 2:
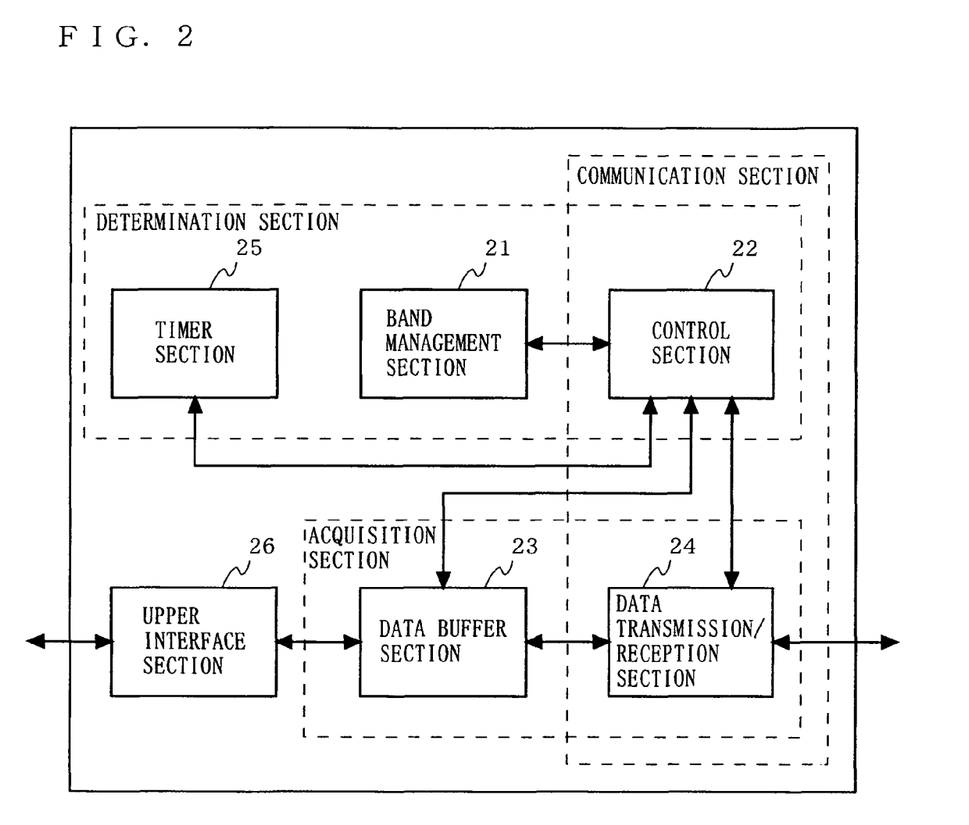
FIG. 2 is a block diagram illustrating an exemplary detailed structure of a station.

As shown in FIG. 2, each master station or slave station comprises a band management section 21, a control section 22, a data buffer section 23, a data transmission/reception section 24, a timer section 25, and an upper interface section 26. The band management section 21 manages various information concerning a communication band. The control section 22 is in charge of controlling the entire station. The data buffer section 23 temporarily stores various packets. The data transmission/reception section 24 may transmit packets which are stored in the data buffer section 23, or store received packets to the data buffer section 23. The timer section 25 keeps points of time related to the data transmission/reception at each station. The upper interface section 26 may be, for example, an interface with an upper-level host, or an interface with another medium (e.g., a communications system) as in the fashion of a bridge. The band management section 21, the control section 22, and the timer section 25 together compose a determination section. The data buffer section 23 and the data transmission/reception section 24 together compose an acquisition section. The control section 22 and the data transmission/reception section 24 together compose a communication section.

Figure 3:
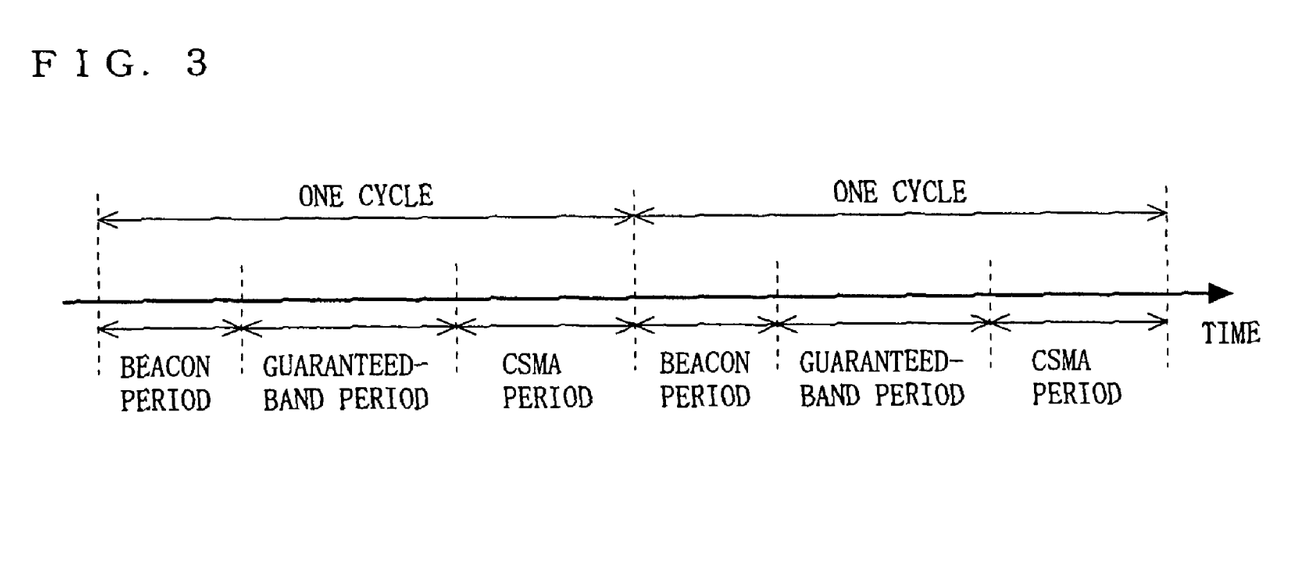
FIG. 3 is a diagram illustrating periods into which a communication band is divided.

According to the present invention, the communication band to be used by the communications systems 11 to 13 is previously divided into a beacon period, a guaranteed-band period, and a CSMA period. The beacon period is a period in which all master stations transmit beacon packets in competition with one another. The guaranteed-band period is a period in which only specific permitted stations are allowed access by using a pre-allocated band. In the present invention, applications to a time division multiple access (TDMA) technique and a frequency division multiple access (FDMA) technique will be discussed. The CSMA period is a period in which all stations are allowed access in competition with one another through carrier sensing. As shown in FIG. 3, these periods repeat themselves periodically.

By means of the timer section 25, the master station 111, the master station 121, and the master station 131 keep the beacon period, the guaranteed-band period, and the CSMA period under management. Typically, system information which defines time allocation for these three periods is transmitted while being stored in a beacon packet.

Hereinafter, an access control method employing a master station and a slave station having the above structures will be described.

First Embodiment

Figure 4:
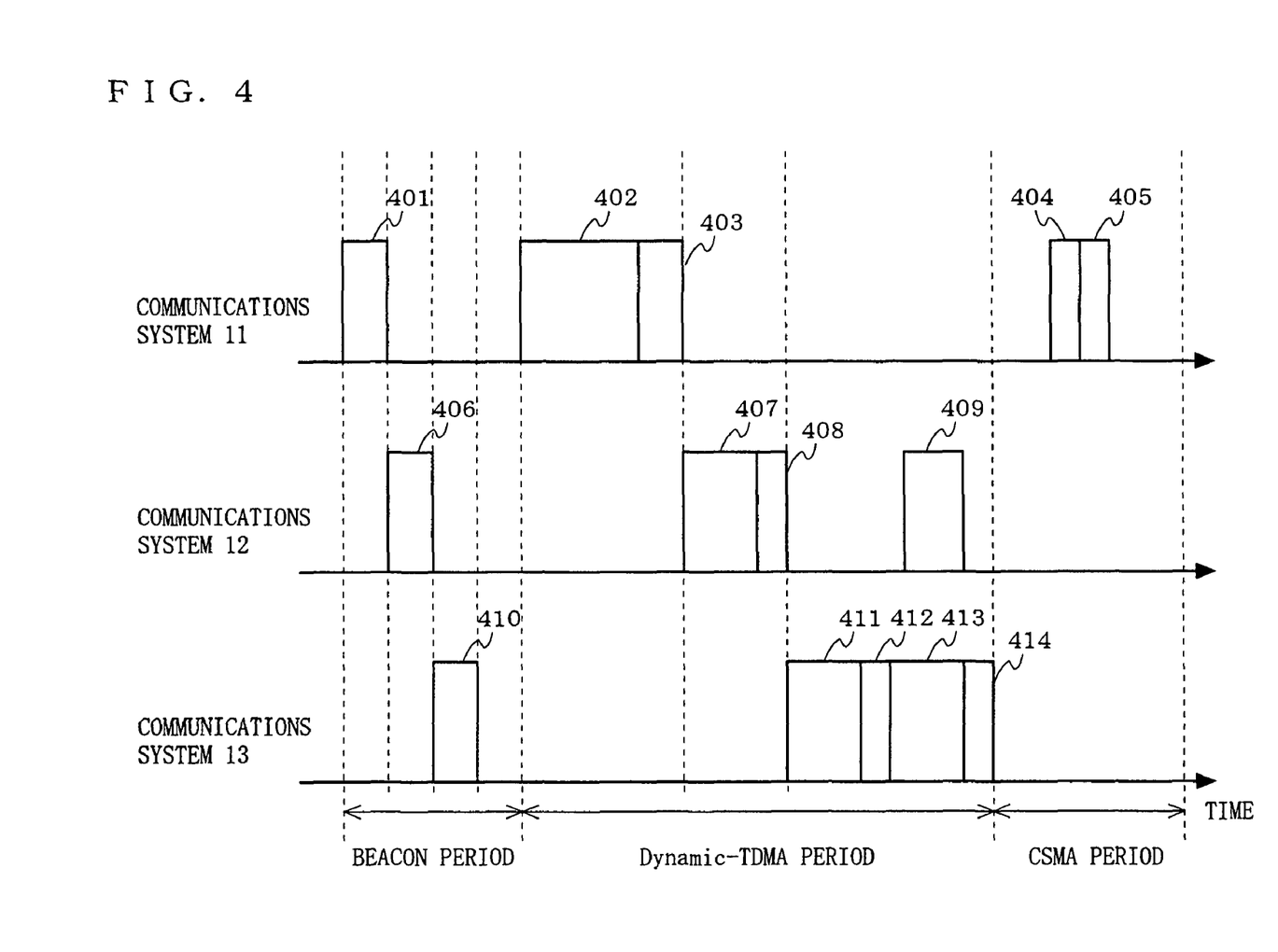
FIG. 4 is a timing diagram illustrating an access control method according to a first embodiment of the present invention.

FIG. 4 is a timing diagram illustrating an access control method according to a first embodiment of the present invention. In the access control method according to the first embodiment, the communication band is divided into a beacon period, a TDMA period in which a communication band (communication slot) to be used is dynamically allocated through time division (hereinafter this period will be referred to as a "Dynamic-TDMA period"), and a CSMA (Carrier Sense Multiple Access) period. The ratio between Dynamic-TDMA period and the CSMA period does not need to be constant. The ratio may dynamically vary depending on the total communication bandwidth required by a particular station which is permitted to perform communications in the Dynamic-TDMA period.

When a start time of the beacon period is reached, each of the master stations 111, 121 and 131 transmits its own beacon packet, in a previously allocated transmission slot. In the example shown in FIG. 4, the master stations 111, 121 and 131 of the communications systems 11, 12 and 13 respectively transmit beacon packets 401, 406 and 410 in this order. In each beacon packet, a transmission time for the beacon packet, a start time of the beacon period, a start time of the Dynamic-TDMA period, a start time of the CSMA period, etc., as governed by the timer section 25, are contained as system information.

The easiest method for determining the timing with which a beacon packet is transmitted by each master station would be allocating fixed transmission slots in the order by which the communications systems were booted. The order of booting may be recognized by having the master stations connected with a wired backbone, or notifying an instance of booting to the other communications systems by utilizing the CSMA period. It would also be possible to, in the beacon period, perform transmissions between the communications systems in competition with one another by utilizing a random access method such as Slotted ALOHA or CSMA. However, in the case where a random access method is used, beacons may not be able to be transmitted in some cases, and therefore both the master station and the slave stations may need to have a system synchronization protecting function.

Figure 5:
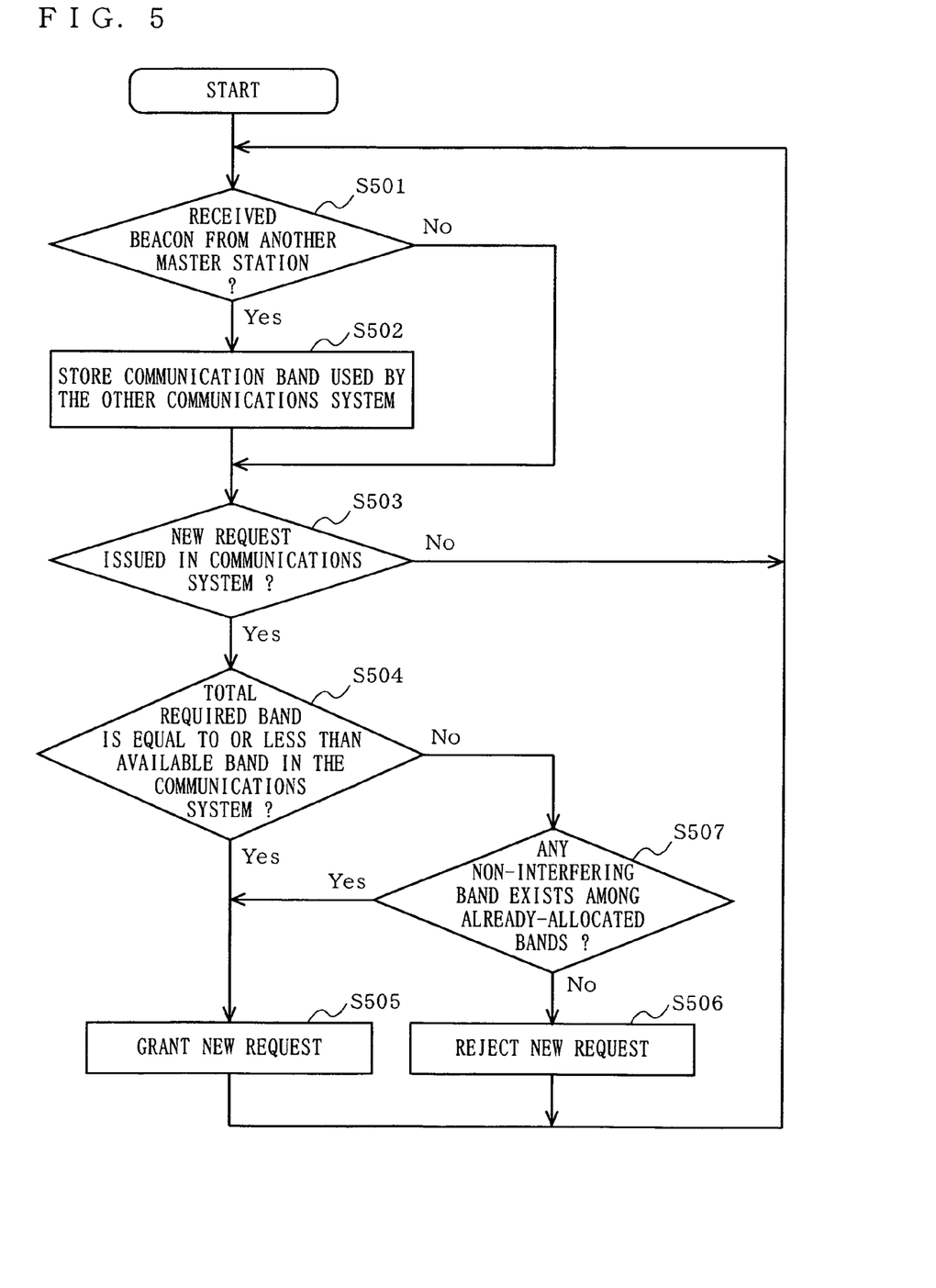
FIG. 5 is a flowchart illustrating the access control method according to the first embodiment of the present invention.

Next, a method for dynamically allocating a communication band (communication time) for each communications system to use in the Dynamic-TDMA period will be described with reference to FIG. 5.

Upon receiving a beacon packet from another master station via the data transmission/reception section 24 (step S501), each of the master stations 111, 121 and 131 temporarily stores the beacon packet to the data buffer section 23. Then, from the beacon packet stored in the data buffer section 23, the control section 22 of each of the master stations 111, 121 and 131 extracts band information (e.g., the beacon period, the Dynamic-TDMA period allocated to the master station's own communications system, the start time of the CSMA period, and the lengths of time allocated to the respective periods), and stores the extracted band information to the band management section 21 (step S502). From the band information, each of the master stations 111, 121 and 131 can recognize at which timing the station having received the request can perform communications in the Dynamic-TDMA period.

Next, each of the master stations 111, 121 and 131 determines whether a new request has been issued in the master station's own communications system (step S503). If a new request has been issued, each of the master stations 111, 121 and 131 newly calculates a communication band which can be used in the master station's own communications system based on the stored band information, and compares the calculated communication band against a sum of the communication band which is currently used by the master station's own communications system and the communication band for the new request (step S504). If the comparison indicates that the aforementioned sum is equal to or less than the calculated communication band, the master station 111 and the master station 131 grant the new request (step S505). On the other hand, if the aforementioned sum is greater than the calculated communication band, the master station 111 and the master station 131 check the communication(s) which has already been allocated a band to confirm whether there is any band which does not interfere with the communication to occur in response to the new request (step S507).

The underlying rational is that, even in the case where a plurality of communications systems generally interfere with one another, there may still be local areas which are free of the influences of interferences, and such areas should be utilized effectively. In the example shown in FIG. 1, if the new request is for a communication between the slave station 132 and the slave station 133, such a communication will not interfere in any way with the communication between the slave station 122 and the slave station 123. Therefore, this new request can be granted while being allocated with the same band as that which is already allocated to the communication between the slave station 122 and the slave station 123. Typically, each master station collects information as to which station each slave station in the master station's own communications system is receiving a packet from. The determination of the station from which a given packet is transmitted can be made based on an address or the like.

Thus, if there is any band which will not have mutual interferences with the communication to occur in response to the new request, the master station 111 and the master station 131 grant the new request (step S505). On the other hand, if there is no band which will not have mutual interferences with the communication to occur in response to the new request, the master station 111 and the master station 131 reject the new request (step S506).

Now, a method performed at step S504 of calculating a communication band available to a master station's own communications system on the basis of the communication bands being used by the other communications systems will be described with respect to a specific example. For instance, let us assume that there is a need to obtain a MAC (Medium Access Control) efficiency of 0.65 and a 20% redundant bandwidth (margin) for retransmission, in the case where the maximum bandwidth in the Dynamic-TDMA period is 30 Mbps and a total communication bandwidth used by the other communications systems is 6 Mbps. In this case, the total communication bandwidth available to all communications systems is 15.6 Mbps ($=30\times0.65\times0.8$). Therefore, the communication bandwidth available to the master station's own communications system is calculated to be 9.6 Mbps ($=15.6-6.0$). Thus, in this example, if a new request only entails a communication band of 9.6 Mbps or less, that request will be granted.

As a method for acquiring information of the communication bandwidth being used by the other communications systems, a technique utilizing the CSMA period as follows may be used, instead of the aforementioned technique utilizing the beacon period. This technique will be described with reference to FIGS. 6 and 7.

Figure 6:
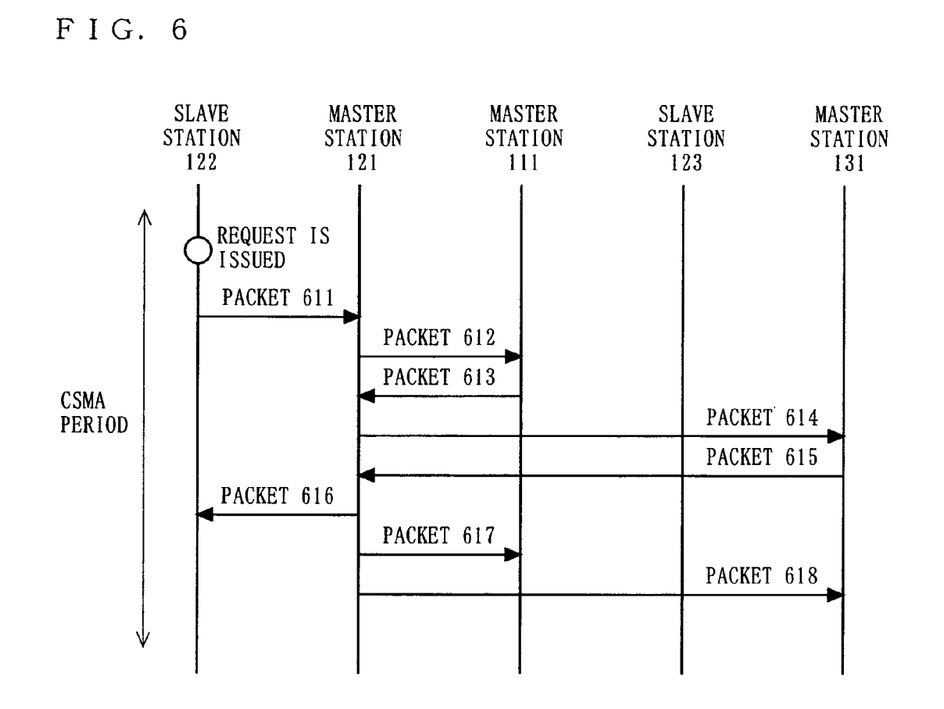
FIG. 6 is a sequence diagram illustrating a method which utilizes a CSMA period.
Figure 7:
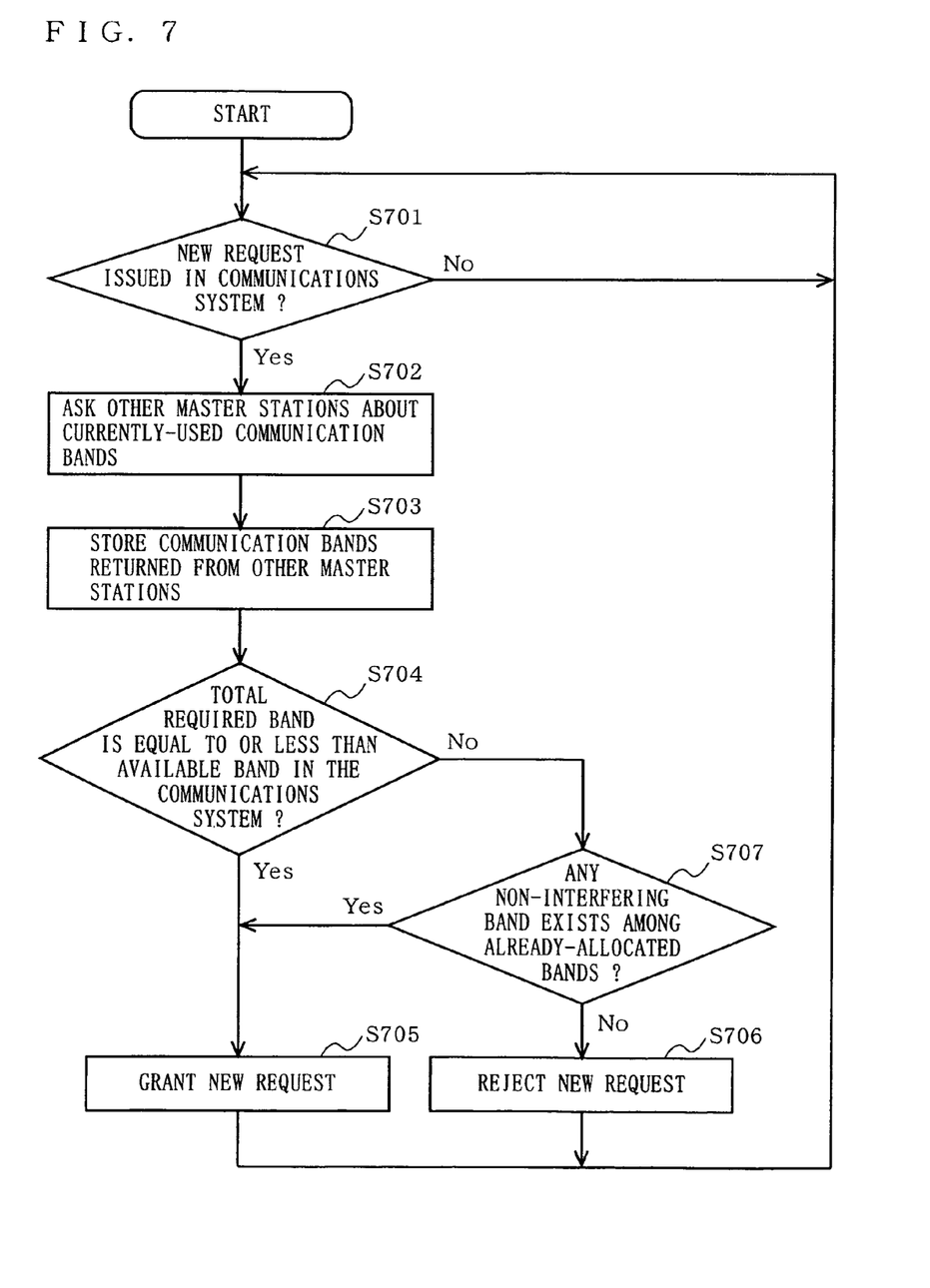
FIG. 7 is a flowchart of a method which utilizes a CSMA period.

For example, if it becomes necessary for the slave station 122 to secure a certain QoS level, the slave station 122 transmits a QoS request packet 611 for the master station 121 of the same communications system (step S701). Having received the packet 611 via the data transmission/reception section 24, the master station 121 temporarily stores the information contained in the packet 611 (i.e., parameters such as the address of the requesting slave station 122 and the requested bandwidth) to the data buffer section 23. Then, the control section 22 of the master station 121 transmits status request packets 612 and 614, respectively, to the master station 111 and the master station 131, which are already recognized by the master station 121 to be present in the neighborhood based on the beacon packets stored in the data buffer section 23 (step S702). Specifically, the control section 22 of the master station 121 generates the packets 612 and 614 in the data buffer section 23, and transmits the packets 612 and 614 to the master stations 111 and 131, respectively, via the data transmission/reception section 24.

Having received the packets 612 and 614, the respective data transmission/reception sections 24 of the master station 111 and the master station 131 store the packets to the respective data buffer sections 23. Then, the respective control sections 22 of the master station 111 and the master station 131 transmit status reply packets 613 and 615, containing information of the used communication bands as stored in the respective band management sections 21, to the master station 121. Specifically, the respective control sections 22 of the master station 111 and the master station 131 generate the packets 613 and 615 in the respective data buffer sections 23, and transmit the packets 613 and 615 to the master station 121, via the respective data transmission/reception sections 24.

Having received the packets 613 and 615 from the master station 111 and the master station 131 (step S703), the control section 22 of the master station 121 determines whether the request from the slave station 122 can be granted or not, based on the information of used communication bands contained in the packets 613 and 615 as well as the aforementioned maximum bandwidth in the Dynamic-TDMA period and the margin (step S704). Moreover, the control section 22 of the master station 121 checks the communication(s) which has already been allocated a band to confirm whether there is any band which does not interfere with the communication to occur in response to the new request (step S707). Based on the results of the above determination and checking, the control section 22 of the master station 121 generates a QoS reply packet 616 containing grant of the request or rejection of the request in the data buffer section 23, and sends the QoS reply packet 616 to the slave station 122 via the data transmission/reception section 24 (steps S705, S706). At the same time, the control section 22 of the master station 121 updates the band information which is managed in the band management section 21.

If the request is granted, the master station 121 transmits to the slave station 122 band information indicating at which point in the Dynamic-TDMA period transmission is granted, the band information being contained in a beacon packet. The slave station 122 detects in the control section 22 that the band information in the received beacon packet has been updated, and transmits data with the designated transmission timing. Thus, data transmission can be performed without competing with the other stations.

The grant of the request or rejection of the request to the slave station 122 is also notified to the other master stations 111 and 131 by transmitting QoS change notice packets 617 and 618 thereto, respectively. If the received packets 617 and 618 necessitate that the start time of the Dynamic-TDMA period used by each master station's own communications system be changed, the other master stations 111 and 131 update the band information which is managed in the respective band management sections 21.

Then, having received the packet 616 indicating grant of the request, the control section 22 of the slave station 122 in the Dynamic-TDMA period transmits data packets using a predetermined communication band. A recipient station which has successfully received the data packets returns an acknowledgement packet.

In the first embodiment, in order to perform packet transmission (packets 402, 403, etc.), each communications system further applies a station-by-station time division to the band which is allocated in the Dynamic-TDMA period. Instead of time division, any other multiple access scheme, such as frequency division or code division, may be employed. The first embodiment illustrates an example where the Dynamic-TDMA period is subjected to a communications-system-by-communications-system time division; alternatively, a station-by-station time division may be applied (where "station" refers to any station which has transmitted a band request). Furthermore, the first embodiment illustrates an example where a desired rate is notified as the band information; alternatively, a desired transmission time which is considered necessary to satisfy a desired rate while taking the media state into account may be notified.

Second Embodiment

Figure 8:
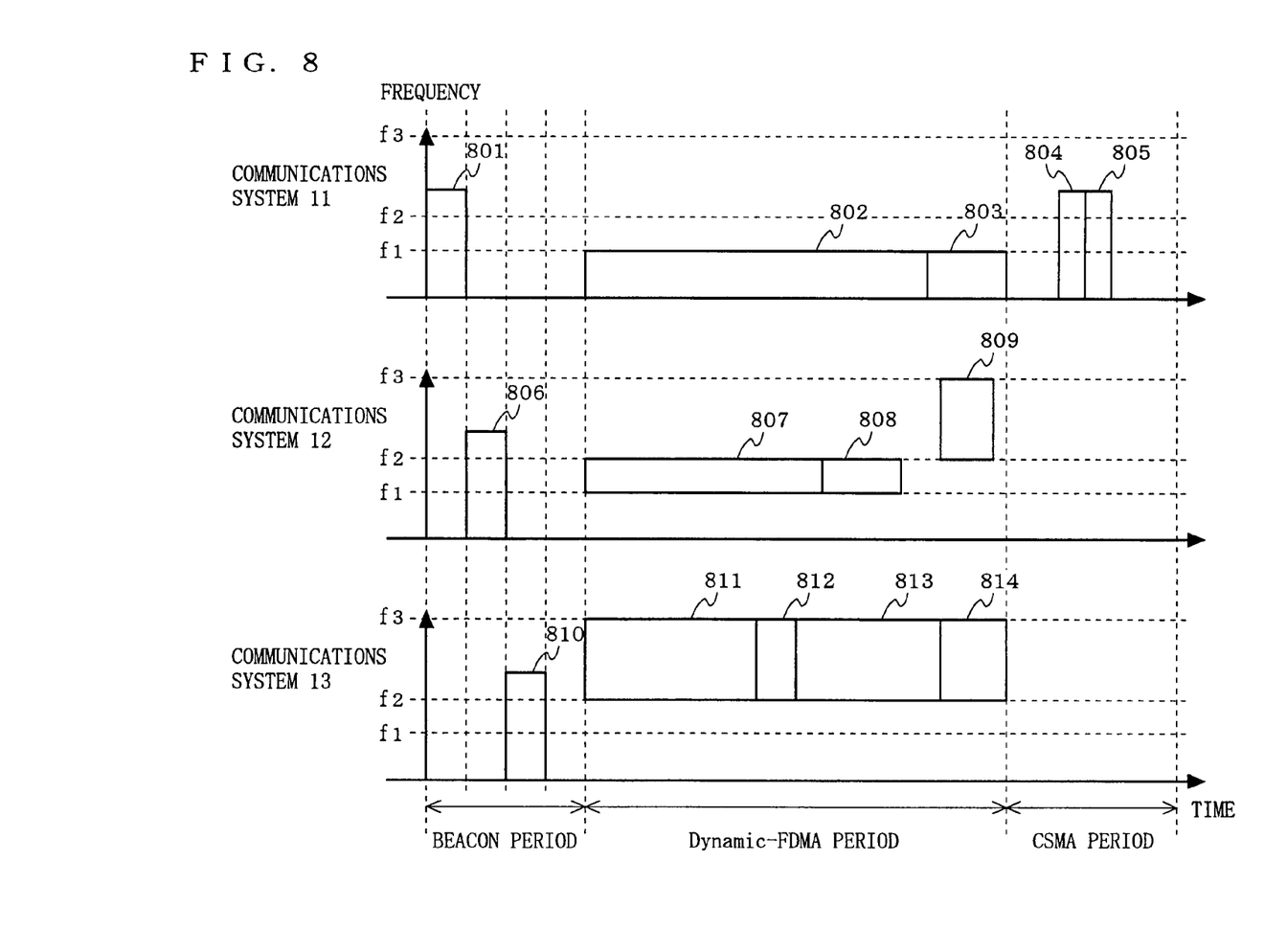
FIG. 8 is a timing diagram illustrating an access control method according to a second embodiment of the present invention.

FIG. 8 is a timing diagram illustrating an access control method according to a second embodiment of the present invention. In the access control method according to the second embodiment, the communication band is divided into a beacon period, an FDMA period in which a communication band to be used is dynamically allocated through frequency division (hereinafter this period will be referred to as a "Dynamic-FDMA period"), and a CSMA period.

When a start time of the beacon period is reached, each of the master stations 111, 121 and 131 transmits its own beacon packet, in a previously allocated transmission slot. In the example shown in FIG. 8, the master stations 111, 121 and 131 of the communications systems 11, 12 and 13 respectively transmit beacon packets 801, 806 and 810 in this order. In each beacon packet, a transmission time for the beacon packet, a start time of the beacon period, a start time of the Dynamic-FDMA period, a start time of the CSMA period, etc., as governed by the timer section 25, are contained as system information. The method for determining the transmission timing of a beacon packet for each master station is as described above in the first embodiment.

Next, a method for dynamically allocating a communication band (frequency bandwidth) for each communications system to use in the Dynamic-FDMA period will be described. The following description assumes that, within the frequency bandwidth available to each communications system, a multicarrier communication method in which communications are performed by using a plurality of narrow-band subcarriers is carried out. It is also assumed that an OFDM technique using 400 subcarriers, to which subcarrier Nos. 1 to 400 are assigned, is employed for instance.

Upon receiving a beacon packet from another master station via the data transmission/reception section 24, each of the master stations 111, 121 and 131 temporarily stores the beacon packet to the data buffer section 23. Then, from the beacon packet stored in the data buffer section 23, the control section 22 of each of the master stations 111, 121 and 131 extracts band information (e.g., the beacon period, the Dynamic-FDMA period allocated to the master station's own communications system, the start time of the CSMA period, and the lengths of time allocated to the respective periods), and stores the extracted band information to the band management section 21. From the band information, each of the master stations 111, 121 and 131 can recognize, in the Dynamic-FDMA period, at which timing the station having received the request can perform communications.

Next, each of the master stations 111, 121 and 131 determines whether a new request has been issued in the master station's own communications system. If a new request has been issued, each of the master stations 111, 121 and 131 confirms the frequency bandwidth (subcarrier(s)) available to the master station's own communications system based on the stored band information, and determines whether there exists any subcarrier which can be used for the new request. If the result of the determination indicates that such a subcarrier (s) exists, the master station 111 and the master station 131 grant the new request. On the other hand, if no such subcarriers exist, the master station 111 and the master station 131 check the subcarriers which have already been allocated to confirm whether any subcarrier exists that does not interfere with the communication to occur in response to the new request. The determination as to the influences of interferences can be made in the manner described above.

Now, a method of calculating a communication band available to a master station's own communications system on the basis of the communication bands being used by the other communications systems will be described with respect to a specific example. For instance, let us assume that the maximum bandwidth in the Dynamic-FDMA period is 40 Mbps; the total communication band being used by the other communications systems is 6 Mbps; and subcarrier Nos. 300 to 400 are being used. Let us further assume that there is a need to obtain a 40% margin for the sake of retransmission or for absorbing differences in efficiency, which depends on the frequency characteristics of each subcarrier. Therefore, in this case, the total communication band which is available to all communications systems is 24 Mbps (=40×0.6). Therefore, the communication band available to the master station's own communications system is calculated to be 18 Mbps (=24−6.0), corresponding to subcarrier Nos. 1 to 299. Thus, in this example, if a new request only entails a communication band of 18 Mbps or less, that request will be granted.

As a method for acquiring information of the communication bandwidth being used by the other communications systems, a technique utilizing the CSMA period as follows may be used, instead of the aforementioned technique utilizing the beacon period. This process is similar to that shown in FIG. 7.

For example, if it becomes necessary for the slave station 122 to secure a certain QoS level, the slave station 122 transmits a QoS request packet for the master station 121 of the same communications system. Having received the packet via the data transmission/reception section 24, the master station 121 temporarily stores the information contained in the packet (i.e., parameters such as the address of the requesting slave station 122 and the requested bandwidth) to the data buffer section 23. Then, the control section 22 of the master station 121 transmits status request packets to the master station 111 and the master station 131, which are already recognized by the master station 121 to be present in the neighborhood based on the beacon packets stored in the data buffer section 23.

24.

Having received the packets, the respective data transmission/reception sections 24 of the master station 111 and the master station 131 store the packets to the respective data buffer sections 23. Then, the respective control sections 22 of the master station 111 and the master station 131 transmit status reply packets, containing information of the used communication bands as stored in the respective band management sections 21, to the master station 121. Each status reply packet contains minimum required band information, used subcarrier Nos., and the like, which are requested in the respective communications system to which the master station 111 or the master station 131 belongs.

Having received the packets from the master station 111 and the master station 131, the control section 22 of the master station 121 determines whether the request from the slave station 122 can be granted or not, based on the information of used communication bands contained in the packets as well as the aforementioned maximum bandwidth in the Dynamic-FDMA period and the margin. Moreover, the control section 22 of the master station 121 checks the communication(s) which has already been allocated a band to confirm whether there is any band which does not interfere with the communication to occur in response to the new request. Based on the results of the above determination and checking, the control section 22 of the master station 121 generates a QoS reply packet containing grant of the request or rejection of the request in the data buffer section 23, and sends the QoS reply packet to the slave station 122 via the data transmission/reception section 24. At the same time, the control section 22 of the master station 121 updates the band information which is managed in the band management section 21.

If the request is granted, the master station 121 transmits to the slave station 122 band information indicating at which subcarrier No. and at which point in the Dynamic-FDMA period transmission is granted, the band information being contained in a beacon packet. The slave station 122 detects in the control section 22 that the band information in the received beacon packet has been updated, and transmits data by using the designated subcarriers, with the designated transmission timing. Thus, data transmission can be performed without competing with the other stations.

The grant of the request or rejection of the request to the slave station 122 is also notified to the other master stations 111 and 131 by transmitting QoS change notice packets thereto. If the received packets necessitate a change in the used subcarrier number information in the Dynamic-FDMA period used by each master station's own communications system, the other master stations 111 and 131 update the band information which is managed in the respective band management sections 21.

Then, having received the packet indicating grant of the request, the control section 22 of the slave station 122 in the Dynamic-FDMA period transmits data packets using a predetermined communication band. A recipient station which has successfully received the data packets returns an acknowledgement packet.

In the second embodiment, in order to perform packet transmission (packets 802, 803, etc.), each communications system further applies a station-by-station time division to the band which is allocated in the Dynamic-FDMA period. Instead of time division, any other multiple access scheme, such as frequency division or code division, may be employed. By employing frequency division, in particular, the only information which is necessary for the station-by-station allocation of communication band is the used subcarrier number information, so that the overhead associated with control packets can be reduced. In a communications system where band allocation is not performed in the Dynamic-FDMA period, it is also possible to perform communications through random access, by utilizing the unused subcarriers.

As described above, in accordance with the access control method of the present invention, the communication band is divided into a beacon period, a guaranteed-band period, and a CSMA period, and the allocation in the guaranteed-band period is determined based on the information of the communication band used by each communications system. As a result, even in the case where plural communications systems share the same channel, it is possible to easily avoid interferences between communications systems without having to perform transmission power control, while retaining good QoS in the communication bands for the respective communications systems.

The technique utilizing the Dynamic-TDMA period described in the first embodiment and the technique utilizing the Dynamic-FDMA period described in the second embodiment may be used in combination. By performing band allocation in terms of both time and frequency, it becomes possible to construct a system which is flexible with respect to the temporal characteristics and frequency characteristics within each communications system.

Note that the above-described embodiments can be realized by causing a CPU to execute program data, which is able to cause a CPU to execute the above-described procedure, stored in a recording medium (a ROM, a RAM, or a hard disk, etc.). In this case, the program may be executed after it is stored in a storing device via a recording medium, or may be directly executed from the recording medium. Here, the recording medium includes a ROM, a RAM, a semiconductor memory such as a flash memory, a magnetic disk memory such as a flexible disk and a hard disk, an optical disk memory such as a CD-ROM, a DVD, and a BD, a memory card, or the like. The "recording medium" as mentioned herein is a notion including a communication medium such as a telephone line and a carrier line.

Note that all or part of the functional blocks composing the master station according to the present invention may typically be realized as an LSI, which is an integrated circuit (which may be referred to as an IC, a system LSI, a super LSI, or an ultra LSI, etc., depending on the degree of integration). Each functional block may be separately constructed in a chip form, or all or some of the functional blocks may be constructed in a chip form.

Also, the method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used.

Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

Figure 9:
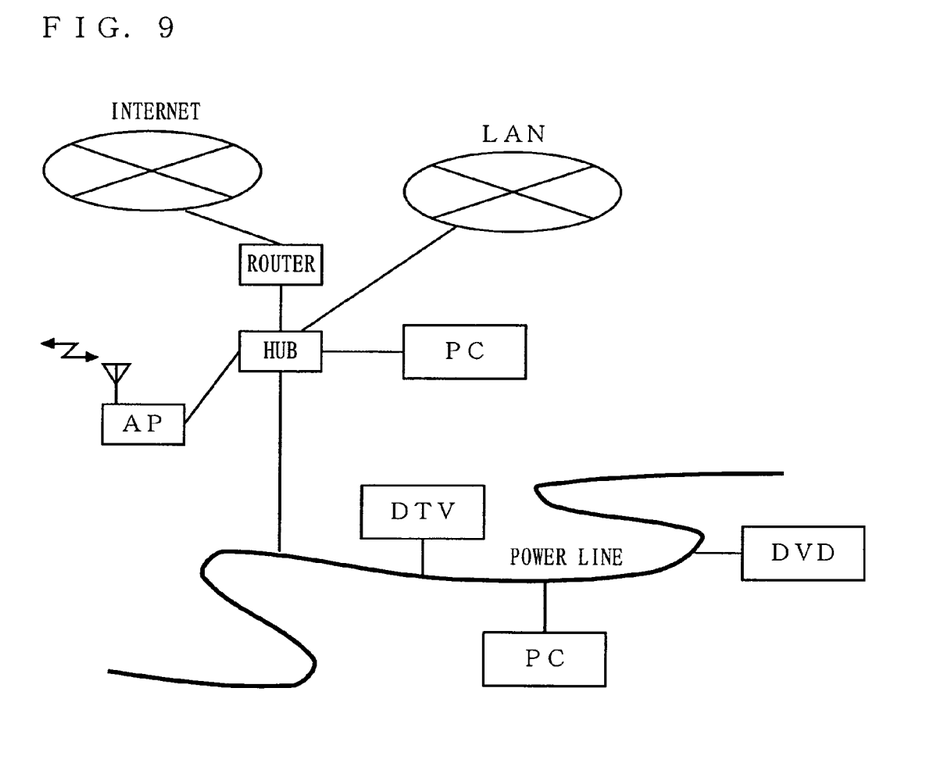
FIG. 9 is a diagram illustrating an exemplary network system in which the access control method according to the present invention is applied to high-speed power line transmission.

Hereinafter, an example in which the above-described embodiments are applied to an actual network system will be described. FIG. 9 is a diagram illustrating an exemplary network system in which the access control method according to the present invention is applied to high-speed power line transmission. In FIG. 9, IEEE1394 interfaces, USB interfaces, or the like of multimedia devices such as a personal computer, a DVD recorder, a digital television, a home server system are connected to a power line via a module which is provided with the functions according to the present invention. As such, a communication network system is configured to transmit digital data such as multimedia data at high speed via a power line. As a result, it is possible to use a power line, which has already been installed in a home and an office, etc., as a network line without the need for installation of a network cable unlike in a conventional cable LAN. Thus, the present invention can be easily installed at low cost, thereby substantially improving user-friendliness.

The above embodiment is an example in which, via an adapter for converting a signal interface of an existing multimedia device to a power line communication interface, the existing device is applied to power line communications. However, in future, the functions according to the present invention may be built into multimedia devices, whereby it becomes possible to perform data transmission between the devices via a power cord of the multimedia devices. In this case, as shown in FIG. 9, wiring for connecting an adapter, an IEEE1394 cable, a USB cable can be eliminated, whereby wiring can be simplified. Also, since connection to the Internet via a router or connection to a wireless or cable LAN via a hub is also possible, it is possible to extend a LAN system using the high-speed power line transmission system according to the present invention. Also, since communication data is transmitted over a power line, it is possible to prevent leakage and interception of data, unlike in a wireless LAN. Thus, the power line transmission method is advantageous in terms of data protection from a security standpoint. It will be understood that data transmitted over a power line may be protected by an IPSec, which is an extended IP protocol, encryption of contents, other DRM schemes, and the like.

Thus, it is possible to perform a high-quality power line transmission of AV contents by realizing copyright protection by encryption of contents, and by implementing a QoS function encompassing the effects of the present invention (improved throughput, and band allocation which flexibly supports increases in retransmission and traffic fluctuations).

While the invention has been described in detail, the foregoing description is in all aspects illustrative and not restrictive. It is understood that numerous other modifications and variations can be devised without departing from the scope of the invention.

What is claimed is:

1. A master station used in a first communication system which includes the master station and a slave station that performs communication based on bandwidth information, wherein the slave station is notified of the bandwidth information by a beacon packet from the master station, the master station comprising:
　　a bandwidth management section for setting, in a cycle, a beacon period of the first communication system such that the beacon period is allocated to a same period as a beacon period of a second communication system, the beacon period of the first communication system including a plurality of slots in a communication bandwidth of a channel; and
　　a communication section for (i) transmitting, in a cycle, a beacon packet including bandwidth information indicating the period to which the beacon period is allocated, the transmitted beacon packet being transmitted in a predetermined slot of the beacon period of the first communication system, and (ii) receiving, in a cycle, a beacon packet including bandwidth information indicating the period to which the beacon period of the second communication period is allocated, the received beacon packet being received in a slot different from the predetermined slot of the beacon period of the first communication system, wherein the received beacon packet is transmitted from a master station included in the second communication system.

2. The master station according to claim 1, wherein the bandwidth management section sets, in a cycle, a CSMA period of the first communication system such that the CSMA period of the first communication system is allocated to a same period as a CSMA period of the second communication system, the CSMA period being a period in which (i) the master station and the slave station of the first communication system and (ii) the master station and a slave station of the second communication system are in competition with one another to perform communication.

3. An access control method executed by a master station used in a first communication system which includes the master station and a slave station that performs communication based on bandwidth information, wherein slave station is notified of the bandwidth information by a beacon packet from the master station, the access control method comprising:
　　setting, in a cycle, a beacon period of the first communication system such that the beacon period is allocated to a same period as a beacon period of a second communication system, the beacon period of the first communication system including a plurality of slots in a communication bandwidth of a channel;
　　transmitting, in a cycle, a beacon packet including bandwidth information indicating the period to which the beacon period of the first communication system is allocated, the transmitted beacon packet being transmitted in a predetermined slot of the beacon period of the first communication system; and receiving, in a cycle, a beacon packet including bandwidth information indicating the period to which the beacon period of the second communication system is allocated, the received beacon packet being received in a slot different from the predetermined slot of the beacon period of the first communication system, wherein the received beacon packet is transmitted from a master station included in the second communication system.

4. The access control method according to claim 3, further comprising setting, in a cycle, a CSMA period of the first communication system such that the CSMA period of the first communication system is allocated to a same period as a CSMA period of the second communication system, the CSMA period being a period in which (i) the master station and the slave station of the first communication system and (ii) the master station and a slave station of the second communication system are in competition with one another to perform communication.

* * * * *